United States Patent [19]
Laurent

[11] Patent Number: 5,908,531
[45] Date of Patent: *Jun. 1, 1999

[54] ASSEMBLING AND VULCANIZING OF TIRES

[75] Inventor: Daniel Laurent, Meylan, France

[73] Assignee: Sedepro, Paris, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/772,250

[22] Filed: Dec. 23, 1996

Related U.S. Application Data

[63] Continuation of application No. 08/378,979, Jan. 27, 1995, abandoned.

[30] Foreign Application Priority Data

Feb. 2, 1994 [FR] France ................................. 94/01476

[51] Int. Cl.⁶ .................................................. B29D 30/10
[52] U.S. Cl. ...................... 156/396; 156/111; 156/130.5; 156/417; 425/38; 425/40; 425/54
[58] Field of Search ......................... 156/11, 136, 130.5, 156/406–2, 117, 397, 417; 425/38, 40, 42, 49, 54

[56] References Cited

U.S. PATENT DOCUMENTS

| | | |
|---|---|---|
| 1,411,588 | 4/1922 | Schultz . |
| 1,604,234 | 10/1926 | Mead ........................................ 425/40 |
| 1,862,655 | 6/1932 | Bostwick ................................... 425/54 |
| 3,281,304 | 10/1966 | Black et al. . |
| 3,682,576 | 8/1972 | Gross . |
| 4,075,054 | 2/1978 | Sons, Jr. . |
| 4,088,524 | 5/1978 | Taylor et al. .............................. 425/38 |
| 4,160,007 | 7/1979 | Pizzorno . |
| 4,197,068 | 4/1980 | Pizzorno . |
| 4,877,468 | 10/1989 | Siegenthaler . |
| 4,895,692 | 1/1990 | Laurent et al. . |

FOREIGN PATENT DOCUMENTS

| | | |
|---|---|---|
| A0481805 | 4/1992 | European Pat. Off. . |
| B1204814 | 11/1965 | Germany . |
| 2006669 | 5/1979 | United Kingdom . |
| 2179307 | 3/1987 | United Kingdom . |
| WO 9200846 | 1/1992 | WIPO . |

OTHER PUBLICATIONS

A.A. Mukhitdinov, V.P. Dorozhkin, Yu.O. Averko–Antonovich, M.A. Polyak—Title *Album Of Principal Flow Charts Of The Rubber Industry*, Moscow, "Khimiya" Publishers 1980.
Investir, "Michelin facing Its competitors" published Jul. 5, 1993.

*Primary Examiner*—Geoffrey L. Knable
*Attorney, Agent, or Firm*—Baker & Botts, L.L.P.

[57] ABSTRACT

The present invention proposes a machine for the manufacture of tires on a core 1 which is used for the manufacture of sa8d tires from the start of the assembling until the vulcanizing. The machine comprises, arranged adjacent to each other on a frame 5, a tire assembly station 2 comprising means for forming the raw tire by depositing the different compounds on the core 1 in the order and place required by the architecture of the tire, a vulcanization station 3, and a support handling station 4, as well as a crane 7 for transporting the core 1 between the different stations.

23 Claims, 5 Drawing Sheets

ASSEMBLING AND VULCANIZING OF TIRES

This application is a continuation of application Ser. No. 08/378,979, filed on Jan. 27, 1995, now abandoned.

BACKGROUND OF THE INVENTION

The present invention relates to the manufacture of rubber tires. It is known that the manufacture of tires comprises, in general, preliminary steps for the preparation of semi-finished products and always includes steps for the assembling and vulcanization of the tire.

The assembly of the tire consists in superimposing the different components of the tire in a suitable order, defined by the architecture of the tire, so as to obtain what is known as a raw tire. The purpose of the vulcanization is to fix the tire in its final shape. For this, a mold of suitable shape is used and the raw rubber is subjected to a certain molding pressure, far greater than atmospheric pressure, while the heat necessary for the vulcanization reaction by an increase of the temperature of the raw rubber is imparted to the latter.

For this, a vulcanization law is employed which the person skilled in the art has little trouble in establishing and which is expressed by a given period of time during which the tire to be vulcanized is held at a given temperature level, generally constant, while keeping it under pressure in order to avoid the presence of bubbles of gas within the rubber and in order to assure a perfect molding of the final manufactured shape.

Tire manufacturing factories have shops dedicated to the assembling of tires, the role of which is to produce raw tires, as well as shops dedicated to the vulcanizing of the raw tires. This results in travel of the raw tires between shops, which travel is responsible for a substantial in-process inventory. U.S. Pat. No. 4,877,468 discloses an organization for just in time flows between the different tire manufacturing shops. However, in as complex an installation as the manufacture of tires, the production of such an installation remains extremely sensitive to breakdowns affecting only one phase thereof. Industrial practice has shown that it is necessary to have buffer stocks in order suitably to take care of transitory failures of a complicated production tool.

SUMMARY OF THE PRESENT INVENTION

The object of the present invention is considerably to simplify the arrangement of the manufacture of the tires. For this purpose, the invention proposes truly interweaving the assembly and vulcanization steps and condensing the manufacturing process by eliminating all buffer stocks.

Another object of the invention is to simplify the installation of the tire manufacturing means in the factory.

In accordance with the invention, the process for the manufacture of rubber tires comprises an assembly step followed by a molding and vulcanization step, followed by a mold-removal step, the vulcanization step employing a mold which imposes, at least in part, its final manufacturing shape on the tire, said mold being formed of several elements, which are separable from each other, at least one of said elements forming a radially dismantlable support forming in operation upon the assembling a stable surface of revolution, said support being used for the manufacture from the assembly up to the vulcanization. It comprises the following steps:

1) transferring and positioning the support at a tire-assembly station and reconstituting the initial configuration used in assembly for said support;

2) successively bringing all the components of the tire, at least in part onto said support, the support being taken as the assembly reference, in the order and at the place required by the architecture of the tire;

3) transferring said support to a vulcanization station;

4) closing the molding space of the tire and proceeding with its vulcanization by the action of temperature and pressure for a period of time determined by the vulcanization law of the tire in question;

5) removing the tire from the mold, this operation comprising a dismantling of said support in order to release the tire;

repeating the preceding steps and thus starting the manufacture of another tire.

By the expression "rigid mold" or "rigid support", it is understood that the mold or support withstands deformation more like steel than like rubber. However, it goes without saying that, as rigidity is a relative concept, the invention does not exclude the fact that the mold or support in question may undergo slight deformations. By the expression "dismantlable support" there is understood, in general, a support which is removable or retractable, or which can undergo any transformation of shape the purpose of which is not to hinder the removal and evacuation of the vulcanized tire. Upon the operation of removal of the tire from the mold, the dismantling of the support takes place radially, which presupposes that the movement of the support with respect to the tire comprises radial movements.

By "continuous surface" there is understood a unitary surface; it is this continuous surface which serves as initial reference for the manufacture; of course, this does not exclude the fact that certain tools feeding the components may bear them on surfaces which are brought to the support for assembling the components to each other. By "stable surface" there is understood a surface the geometry of which is not substantially modified by the operations of depositing the components. For example, if one of these operations comprises a rolling, said surface must permit the rolling.

In accordance with a variant of the invention, after the vulcanization and before starting the manufacture of another tire, the support is cooled in order to return its temperature to a level far greater than room temperature but less than a threshold above which the vulcanization takes place. This threshold depends on the vulcanization system used.

The invention makes use of the technique of assembling a tire on a support which imparts the internal or external shape to the tire. In the carrying out of the invention, the period of time necessary for assembling a tire and then bringing it into a condition which permits its vulcanization is slight. By fixing said threshold at a temperature of about 130° C., it can be considered that the vulcanization does not start before the introduction of the raw tire into the vulcanization station.

One advantage of lowering the temperature to a level which is slightly lower, for example, to a temperature of between 80° C. and 110° C., is that this favors the adherence of the first layer of rubber with which the support is to be provided at the assembly station in order to start the assembling of the tire, in particular if the latter is a smooth core which determines the shape of the inside cavity of the tire.

The time necessary for the assembling of the raw tire depends on the means selected to effect it. In order to be able properly to coordinate the assembling and vulcanization cycles, the process of the invention can be employed with the use of several molds simultaneously. If the vulcanization law leads to a longer period of time for vulcanization than the time necessary for the assembling of the tire, there can preferably be used a vulcanization station which can receive several molds at the same time and which is associated with an assembly station which assembles a single tire at a time. If, for instance, the vulcanization station can receive three molds then, in first approximation, the time necessary for the vulcanization can be three times longer than the time necessary for the assembling (without taking into account the influence on the overall cycle of the times of transfer between stations).

In accordance with one embodiment, said support is a sectional core which makes it possible to define the inner surface of the tire on which the different components of the tire are deposited. The process therefore comprises the following steps:

closing an outer mold part around the raw tire produced on the core, imparting the heat necessary for vulcanization to the outer part of the mold and said core;

opening the outer part of the mold;

disassembling and extracting the rigid core from the inside of the tire in order to separate the tire from the core and evacuate the tire;

reconstituting the core serving as support.

In this case, in order fully to benefit from the invention, there is preferably used at least one core more than the outer molds in order to be able to assemble one tire (step 2 of the tire manufacturing process described above) while another tire is in the vulcanization phase (step 4 of the tire manufacturing process described above), which makes it possible to guarantee a good rate of utilization of the molds.

When employing the principle of vulcanization in a rigid mold which comprises an outer mold and a core, as described in U.S. Pat. No. 4,895,692, in order to be able to use indiscriminately several cores with several outer molds, it is advisable to respect the very close manufacturing tolerances of these parts so that the molding volume of the tire remains substantially constant. The manufacturing tolerances of these parts can possibly be increased by using at least two cores per outer mold, in all cases respecting the same associations of a mold with its corresponding cores.

The invention also proposes a tire manufacturing machine comprising at least one support which, in configuration used for the assembly, forms a surface of revolution having a continuous shape, close to the final shape of manufacture of the tire, said support being retractable radially, said support being used as reference surface for the manufacture of said tires from the start of the assembly up to the vulcanization, said machine comprising:

a tire-assembly station comprising means for grasping and holding the support and means for forming the crude tire by depositing on the support different components in the order and at the place required by the architecture of the tire;

a vulcanization station;

means for radially retracting said support; and comprising means for transporting the support between the different stations.

In accordance with another aspect, the invention proposes a tire manufacturing machine comprising at least one support which, in the configuration used for the assembling, forms a surface of revolution having a continuous shape, close to the final shape of manufacture of the tire, said support being used as a reference surface for the manufacture of said tires from the start of assembling up to the vulcanization, said machine comprising, arranged adjacent each other on the same frame:

a tire assembling station, comprising means for grasping and holding the support and means for forming the raw tire by depositing on the support different components in the order and at the place required by the architecture of the tire;

a vulcanization station; and comprising means for transporting the support between the different stations.

In accordance with another aspect, the support forms a surface of revolution contained between two limits axially separated from each other by a substantially constant distance.

The expression "shape close to the final shape" as used herein means that until removal from the mold, said support will not impart to the tire during the course of manufacture any shaping movement other than possibly a slight expansion during the molding and vulcanizing step. Stated differently, during the assembling step, the support does not effect any movement, while at the start of the vulcanization step the support can possibly be imparted a slight movement of an amplitude which is always less than the thickness of the products placed on the support.

One of the advantages of the concept of the invention is that it is possible completely to mount such a machine and test it at a place which specializes in the mounting of such machines. When the machine is operational, it is transported to the tire manufacturing factory where it can enter into production immediately or after only a few connections or the installation of modules and/or simple servicing measures to be carried out, which does not exclude, if applicable, the mounting of certain peripheral members. This is particularly true in the case of the machine having different stations arranged on a frame, the transporting of which machine even in "ready-to-operate" condition being then possible and very simple.

This also makes it possible to construct a very compact machine which effects both the assembling and the vulcanization. Prior to the present invention, only individual assembling machines were used, such as proposed by numerous manufacturers of tire assembling machines or of assembly lines, in which assembly drums travel in front of different servicers for the placing-on of products, as described, for instance, in U.S. Pat. No. 3,281,304. Whatever the approach followed to install a given product capacity, this has always led to occupying substantially the same floor space. The use of the invention makes it possible considerably to reduce, i.e. on the order to 75%, the space occupied on the floor for a given production capacity.

In accordance with a preferred embodiment of the present invention, the machine comprises a station dedicated to the handling of the support. The stations for the making, assembling and disassembling of the support and vulcanization are preferably aligned on the same frame. The said transport means are advantageously adapted to move the support with its axis horizontal, assuring preferably a movement between stations which is parallel to the axis of the support. This permits making the machine as compact as possible.

Full details are given with the description of the accompanying figures, illustrating one embodiment of the invention.

DESCRIPTION OF PREFERRED EMBODIMENT

Figure 1:
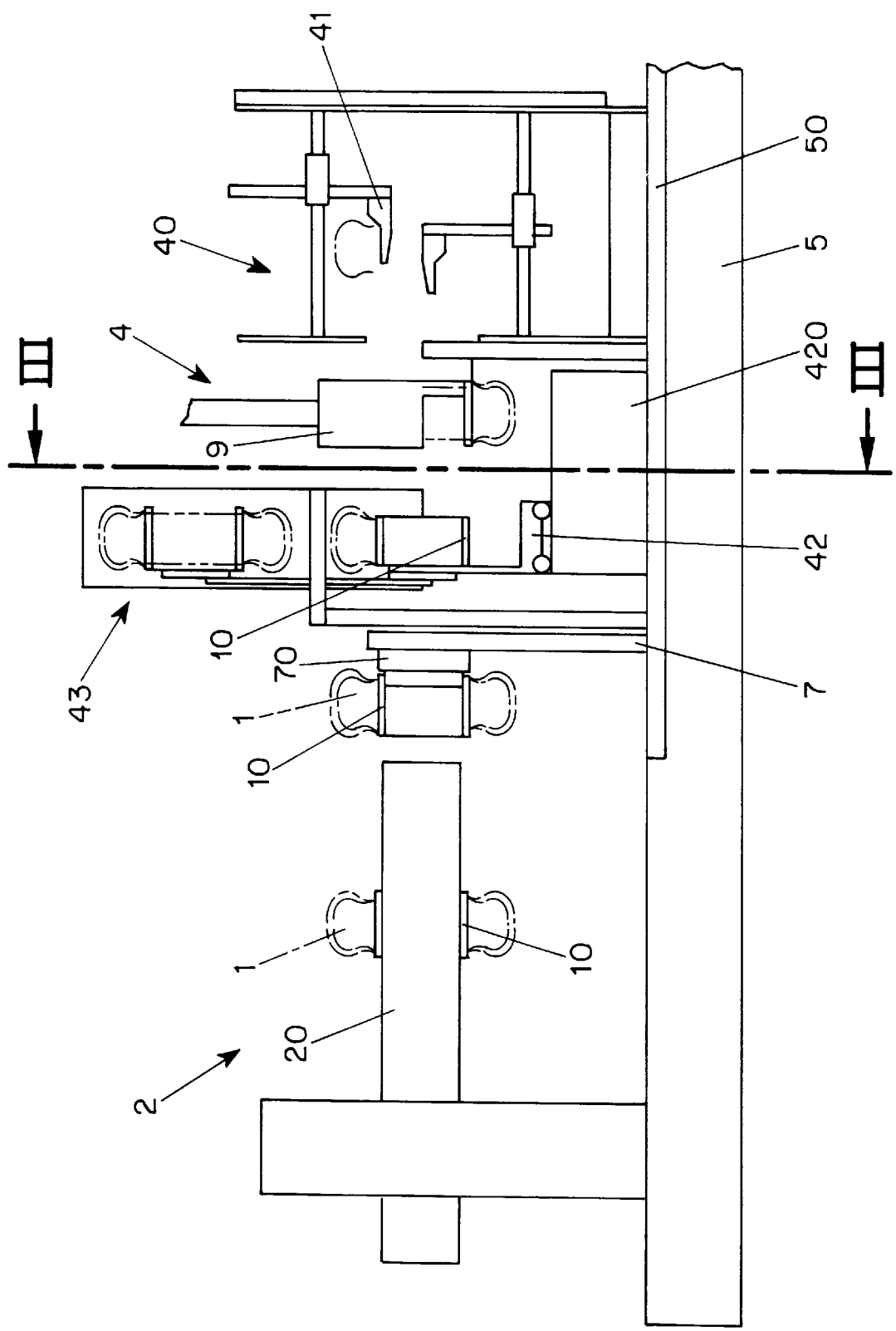
FIG. 1 is an elevation showing part of a machine in accordance with the invention.
Figure 2:
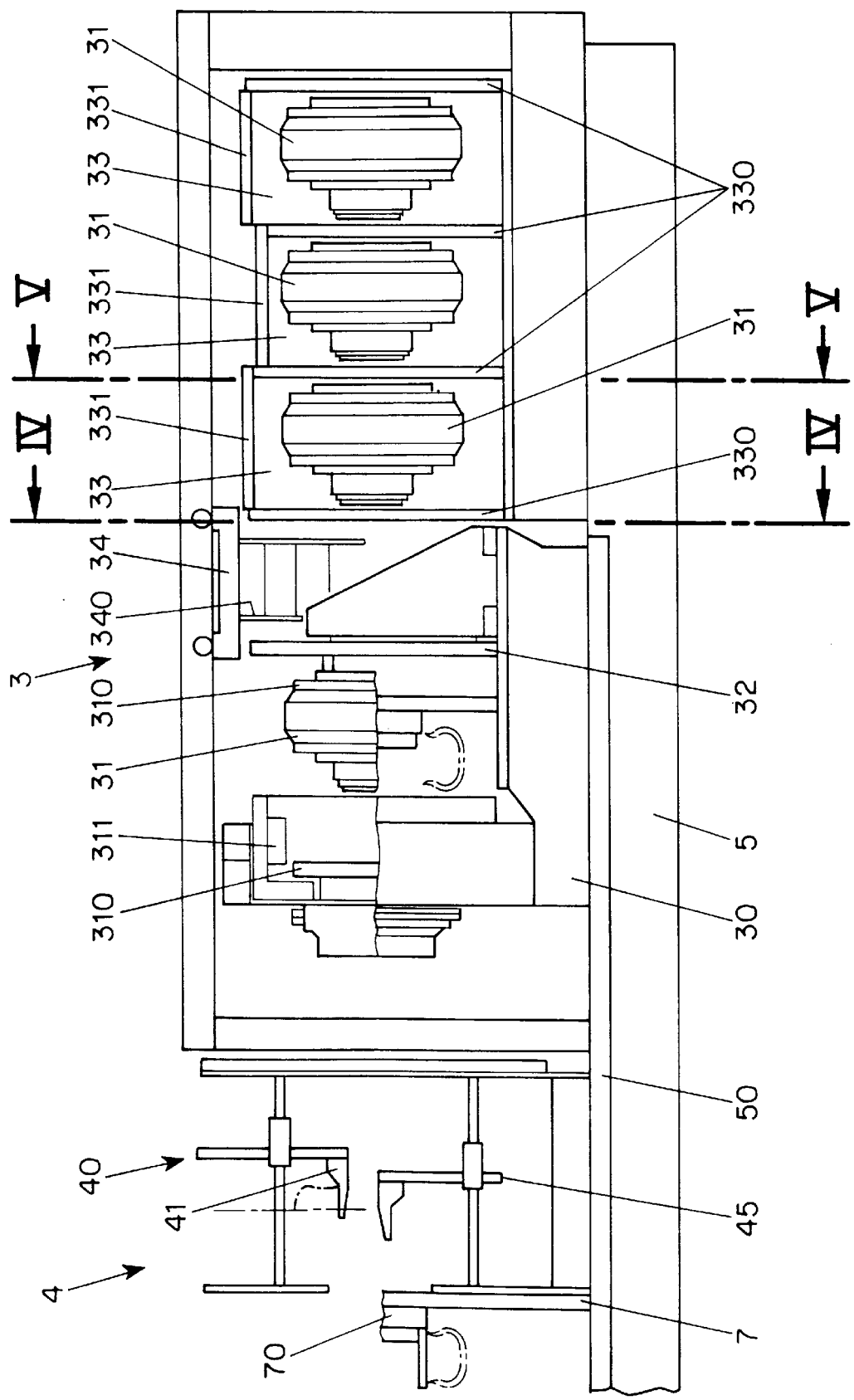
FIG. 2 is a view supplementing the preceding figure.

Each of FIGS. 1 and 2 includes a part of the other figure in order clearly to show the entire machine. A core 1 is shown at different places. These are not necessarily different cores. They may be the same core shown at different places or different cores, depending on the number of cores used. In some cases the core shown bears a tire or a tire blank, which is indicated diagrammatically by a line around the profile of the core and in some cases the core is bare. Furthermore, at certain places, different successive configurations of the machine have been shown below and above the longitudinal axis line. The purpose of this is to show the condition of the machine in different successive steps of the manufacturing process.

An assembly station 2, a support handling station, referred to more simply in this example as "core station" 4, and a vulcanization station 3 are mounted on the same frame 5. Each of these stations is formed of one or more modules fastened to said frame 5.

The circulation of the core or cores between the different stations is assured by means for transporting the core 1 which are employed for the following movements:

to transport the support bearing a raw tire from the assembly station to the vulcanization station;

to transport the support leaving the vulcanization station to the support-handling station;

to transport the support from the handling station to the assembly station.

This is the task of a crane 7 which is slidably mounted on a rail 50 arranged along the frame 5. The rail 50 constitutes a guide means which is rigidly mounted on said frame 5 to permit the crane to be displaced along the frame to the different stations. The crane 7 is equipped with a gripper 70 which is adapted to grip a core 1 by the radially inner base thereof. The different constituent elements of the core 1 are held together by a rim 10 which is inserted radially within said elements. This rim 10 which bears the core 1 can be coupled when desired to the gripper 70 by a hooking mechanism or the like.

At the assembly station 2, the rim is mounted on a shaft 20 which supports it while being able to drive the core 1 in rotation in order to deposit all the products forming the raw tire, namely the different rubber mixes and the reinforcements. The present invention does not concern the structures or operation of the devices necessary for effecting the deposit of these products.

By way of illustration and not of limitation, reference may be made to U.S. Pat. Nos. 4,801,344, 4,804,436, 5,039,372, 5,362,343, 5,281,289 and to applications EP 0 580 055 or EP 0 582 215 which describe devices which can be used to deposit the reinforcement cords. Reference can be made to U.S. Pat. Nos. 4,963,207 or 5,261,795 which describe devices which can be used to apply the rubber mixes on a core 1.

After production of a raw tire, said crane 7 can, at the assembly station 2, grasp the core 1 which supports a raw tire and transport it towards the vulcanization station 3 (see FIG. 2). The same crane can transport core 1 bearing a vulcanized tire, freed of the outer mold, from the vulcanization station 3 to the core station 4. The same crane 7 can transport a bare core 1, that is to say a core without the previously manufactured vulcanized tire, from the core station 4 to the assembly station 2.

As a variant (see FIG. 3), another crane 8 can be installed which is mounted for sliding along the other side of the frame, it also being equipped with a gripper 80 capable of gripping a core 1 by its radially inner base. By using two cranes, it is possible to effect two transports completely or partly simultaneously. For example, the second crane 8 is entrusted with transportation from the vulcanization station 3 towards the core station 4 and from the latter towards the assembly station 2, or else only with said latter transportation, that is, from the core station to the assembly station.

In order to optimize the use of all of the components of the machine, it is advantageous to carry out different operations concerning the support at the station for the handling of the support. For this reason, means for separating the vulcanized tire from its support are preferably installed at a station which is dedicated to the handling of the support. This is also the reason why the assembling and disassembling of the support are carried out at the support-handling station. In order to obtain the same advantage, forced cooling of a support can also be effected at a support-handling station.

Thus, at the core station 4, a mounting unit 40 assures the assembling and disassembling of the cores. More generally, such a unit assures the dismantling and reconstitution of the support. It is known, in fact, that in order to be removed from a vulcanized tire, the cores must be made in several parts which can be extracted from the tire through the space available between and within the beads of the tire. This unit 40 comprises as many grasping means 41 as there are elements in a core 1. Each grasping means is mounted on a mechanism 45 which individually assures independent displacements in the radial and axial directions of said elements (with reference to the axis of core at the core station). The mechanism 45 includes a radially displaceable horizontal guide for each grasping means.

Let us assume that a core bearing a vulcanized tire is introduced into the core station 4 by the crane 7 (see the lower half of the central region of the core station 4 in FIGS. 1 and 2). A translator 42, which can slide on a platform 420, grasps the rim 10 on the side left free by the gripper 70. The gripper 70 disconnects and the crane 7 moves away. The translator returns to its original position (see lower part of the left-hand region of the core station 4 in FIG. 1), while taking away the core 1 bearing a vulcanized tire.

An evacuation crane 9 then assumes the position shown in the upper half of the central region of the core station 4 in FIG. 1. The function of crane 9 is to remove the vulcanized tire from the machine for handling and shipping. To this end, said crane is lowered into said position. The translator 42 advances in order to insert the tire into the evacuation crane 9. The latter grasps the tire by the tread. All the grasping means 41 are engaged on the corresponding core elements and locked on them. Thereupon, the translator can disconnect the rim 10 from the core 1 and carry the latter away in order to free the elements of the core 1 (see upper part of the left-hand region of the core station 4 in FIG. 1). All the elements of the core can then be removed, one after the other, from the tire by movement of the corresponding grasping means 41, initially a centripetal radial movement, then an axial movement of release, and finally a centrifugal radial movement which is sufficient to leave the space necessary for the movement of the other parts. The tire which is held by the evacuation crane 9 can be evacuated from the machine.

The reconstruction (that is to say the assembling) of the core 1 takes place in the reverse order. An opposite movement of the lances returns the elements of the core to their prior position (that which they occupied when the core 1 bore a vulcanized tire). The translator 42 brings back the rim 10 to support and lock all the elements of the core 1, whereupon the lances are released and removed.

The translator 42 can then introduce the core 1 into a core cooling installation 43. The cooling installation 43 is integrated in the core mounting and dismounting station 4. It comprises nozzles which blow air into the core, the inner part of the latter forming a hollow which is open radially towards the inside.

As a variant, the core 1 can be introduced into the cooling installation 43 while it still bears the tire coming from the vulcanization station 3. In this case, the tire is cooled somewhat before being freed of the core 1. The core can then be again used immediately for a new assembling or after a wait at the core station 4, or first of all undergo another cooling, in accordance with the temperature conditions indicated above and in accordance with the availability of the assembly station 2.

Figure 3:
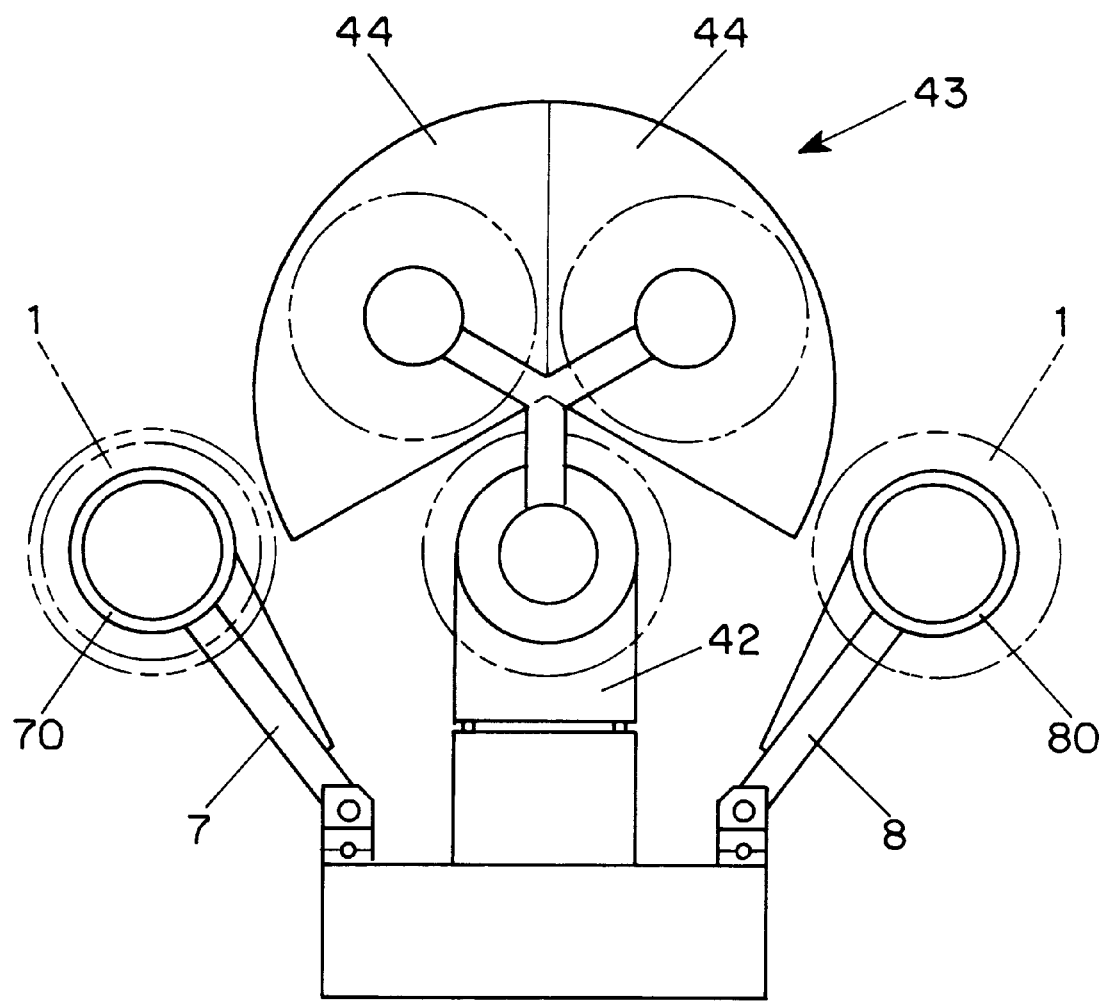
FIG. 3 is a view along the line III—III of FIG. 1.
Figure 4:
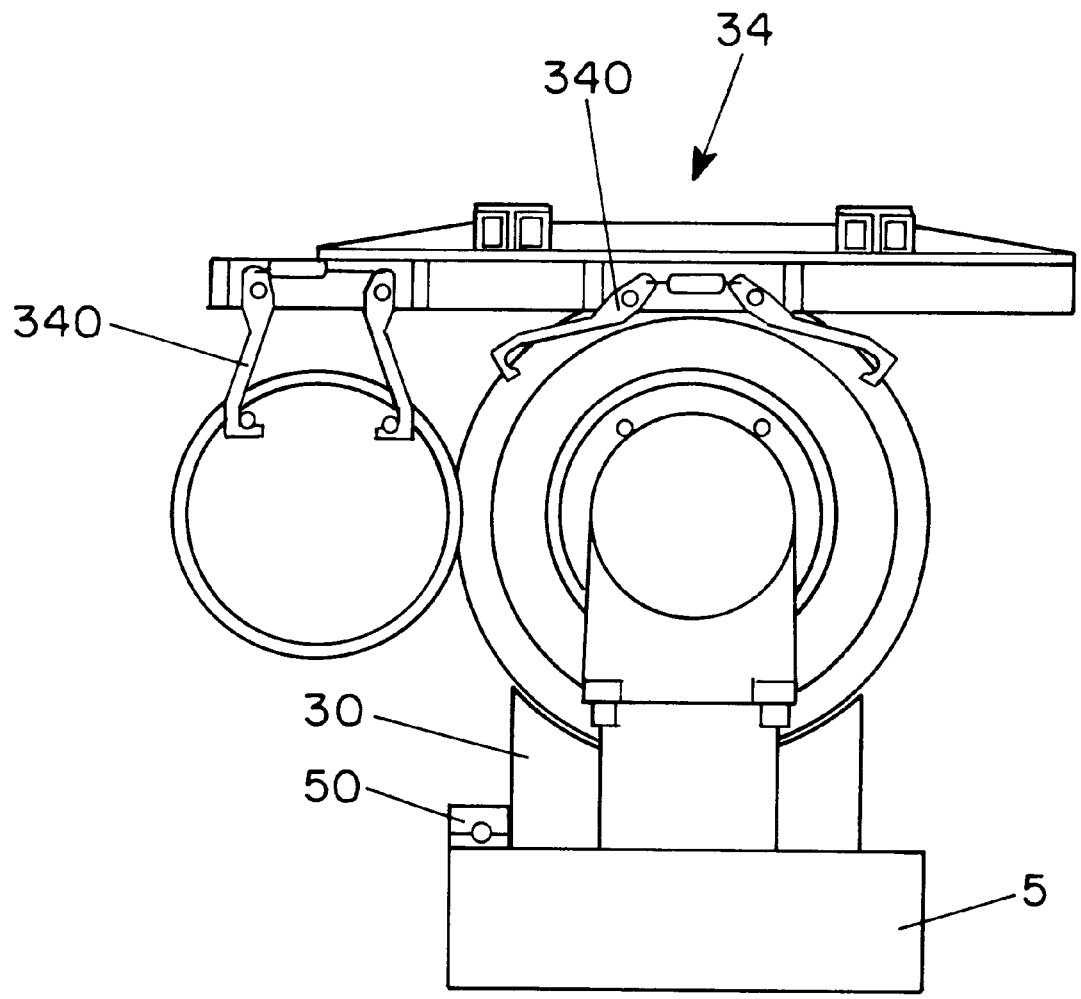
FIG. 4 is a view along the line IV—IV of FIG. 2.
Figure 5:
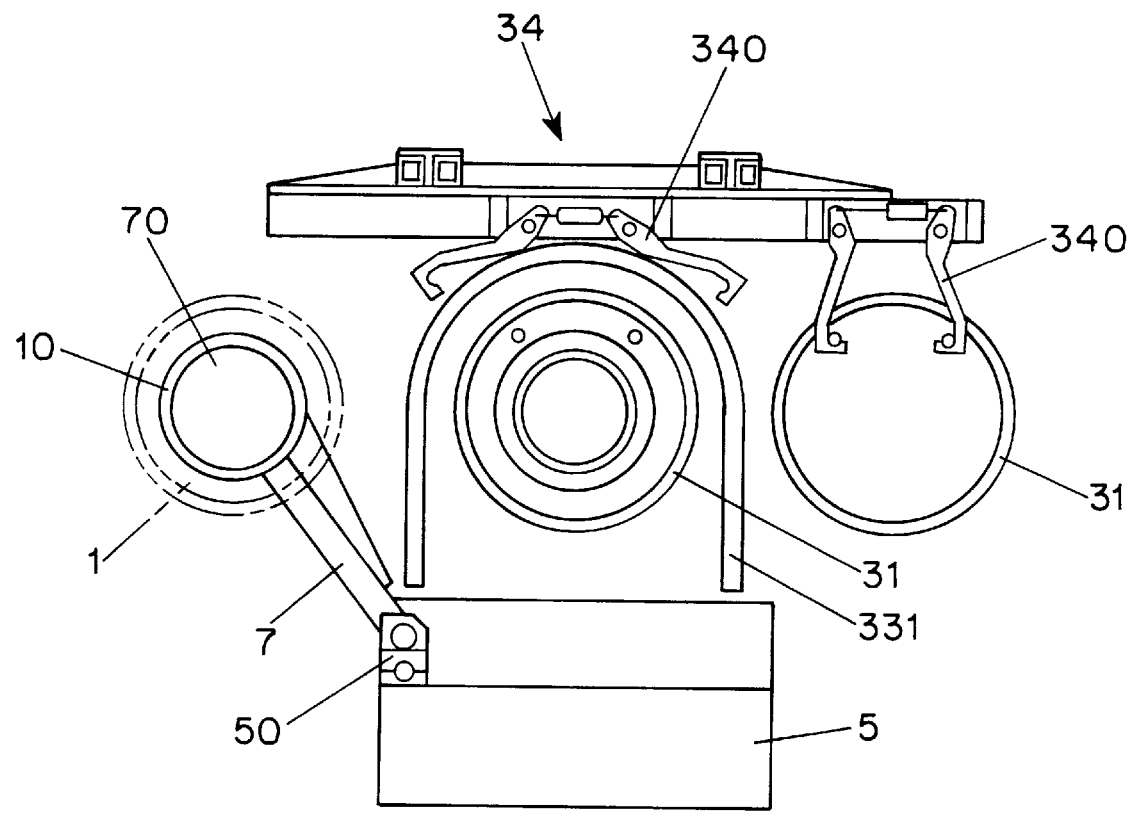
FIG. 5 is a view along the line V—V of FIG. 2.

The cooling installation 43 may, as shown in FIG. 3, comprise several chambers 44 (in this case two) each capable of receiving a mounted core, whether bare or bearing a tire. This makes it possible to have sufficient time to lower the temperature of the cores used to a suitable level, and this also makes it possible, when using two cores per mold, to have a sufficient number of places to receive all of the cores traveling in the machine.

The vulcanization station 3 comprises an encaser 30 making it possible to shut or open an outer mold 31 around the tire borne by the core. Said outer mold 31 comprises two shells 310 for the molding of the side walls and a part 311 for the molding of the tread. The encaser 30 has a side door 32 used as means for the displacement of a shell 310 of the outer mold 31. The encaser is equipped with means permitting the transfer to the mold and to the core of the heat necessary for the vulcanization (for instance infrared radiation, electromagnetic induction, etc.).

The machine of the present invention is intended for use with up to four outer molds simultaneously. The vulcanization station therefore comprises three adjoining housings 33 associated with the encaser 30, making it possible for each to maintain an outer mold 31, containing he tire on its core, isolated from the environment in order to limit heat losses, at least during the time necessary for the vulcanization. Each housing 33 is defined by side partitions 330 and a sliding tunnel 331 which can move on or below the adjacent sliding tunnel 331. Such a vulcanization station, used with at least one adjoining housing, makes it possible to have a collective curing installation, which has the advantage that, whatever the assembly means used, it is possible more intensely to use the mechanisms which ensure the movements of the mold, instead of leaving them stationary for a large part of the time necessary for the vulcanization.

Outer mold transfer means assure the displacement of the outer mold between the encaser 30 and the annexed housing 33 or one of the annexed housings 33 provided. For this purpose, there is a transfer carriage 34 which has two articulated clamps 340 each of which can grasp a mold.

Let us assume that a tire is at the end of the vulcanization period in one of the housings and that another tire comes precisely to be packed in a mold at the encaser 30 and is ready for transfer towards one of the annexed housings. The transfer carriage 34 moves, if it is not already waiting there, and presents one of its two clamps 340 open, above the housing which is to be freed. The corresponding sliding tunnel 331 opens. The clamp 340 grasps the mold 31 and lifts it slightly.

The carriage moves transversely and then longitudinally up to the encaser 30. In the meantime, the door 32 of the latter has opened moving longitudinally while bearing an outer mold by one its shells 310. The clamp 340 which is still free grasps this mold, which 30 is then freed by the door 32 of the encaser. The transfer carriage 34 moves laterally until the other outer mold can be grasped by the door of the encaser. The mold containing the vulcanized tire can then be reintroduced into the encaser in order to be freed of the outer mold, while the mold containing the tire at the start of vulcanization can be brought into a housing 33 by the transfer carriage 34.

The movements of the transfer means and of the transfer carriage are preferably placed under the control of an automatic system having a program which enables it to select the position (given station, given cell at the core station) towards which the cranes transport a given core as a function of the normal sequence of manufacturing operations of the tire and as a function of the occupation of the stations at the moment of a transfer, and to select the position towards which the transfer carriage brings a given mold as a function of the normal sequence of the tire manufacturing operations and as a function of the occupation of the positions available at the vulcanization station at the time of the transfer.

By assuring the circulation of one or more supports between three separate stations, an assembly station 2, a vulcanization station 3, and finally a support handling station 4, an extremely compact cycle and excellent productivity of the machine are obtained. In particular, the support handling station 4 permits the extraction and remounting thereof and the placing thereof at an ideal temperature for starting a new building, without mobilizing the other stations of the machine.

Of course, the present description is not limitative. Numerous structural changes in machines in accordance with the present invention can be made. For example, the invention can be used with other types of rigid support than a core. Or else, the invention can be used with one or more single-position vulcanization members (that is to say, without annexed housing) associated with an assembly station. The invention can also be used with molds of different dimensions used simultaneously on the same machine in order to manufacture tires of different types.

I claim:

1. A tire manufacturing machine comprising at least one support forming, in configuration used for the assembly, a surface of revolution having a continuous shape, close to the final shape of manufacture of the tire, said support being used as a reference surface for the manufacture of said tires from the start of the assembling through the vulcanizations said machine further comprising in an arrangement adjacent each other and mounted on the same frame designed to be transportable and ready to operate:

a tire assembly station having means for grasping and holding the support and means for building the raw tire by depositing on the support different components in the order and at the place required by the architecture of the tire, a vulcanization station, the stations being aligned along the frame, said machine further comprising means mounted on the frame for transporting the support between the different stations along an axis parallel to the aligned stations on the frame and means at each station for receiving the support from the support-transporting means.

2. A machine according to claim 1, in which said support is dismantlable, comprising means for dismantling said support in order to free the tire after vulcanization, as well as means for reconstituting said support before its use to shape the raw tire.

3. A machine according to claim 2, characterized by the fact that said means for dismantling the support and said means for reconstituting the support are installed at a station dedicated to the handling of the support, which station is arranged on said frame adjacent at least one of the other two stations.

4. A machine according to claim 3, characterized by the fact that said means for the transport of the support are used for the following movements:
- to transport the support bearing a raw tire from the assembly station towards the vulcanization station,
- to transport the support coming from the vulcanization station towards the support handling station,
- to transport the support from the handling station towards the assembly station.

5. A machine according to claim 3, characterized by the fact that the support handling station includes a radially retractable means for separating the vulcanized tire from its support.

6. A machine according to claim 3, characterized by the fact that the support handling station comprises an installation for the cooling of said support.

7. A machine according to claim 6, characterized by the fact that said cooling installation comprises several chambers capable of receiving a support, with or without a tire, in its configuration used for the assembling.

8. A machine according to claim 1, characterized by the fact that said means for the transport of the support slide along a guide means mounted rigidly on said frame.

9. A machine according to claim 1, or in which said support is a core defining the inner surface of the tire and on which the different components of the tire are progressively deposited, the core and an outer mold part forming a tire mold.

10. A machine according to claim 9, in which the core is a sectional rigid core.

11. A machine according to claim 10, characterized by the fact that said transporting means comprise a crane which is slidably mounted along the frame and the crane is equipped with a gripper capable of grasping a rigid core by a radially inner base thereof, said transporting means transporting the rigid core in mounted state from a core mounting and dismounting station towards the assembly station, and another crane mounted slidably along the other side of the frame and equipped with a gripper capable of grasping a rigid core by the radially inner base thereof for transporting the rigid core for supporting the tire.

12. A machine according to claim 9, characterized by the fact that said transporting means comprise a crane which is slidably mounted along the frame and the crane is equipped with a gripper capable of grasping a core by the radially inner base of the core.

13. A machine according to claim 9, characterized by the fact that the vulcanization station comprises an encaser which makes it possible to shut or open said mold outer part around the tire borne by the core, said outer mold part having two shells for the molding of the sidewalls and a part molding the tread, said encaser having a side door used as means for displacement of a shell of the outer mold, said encaser being equipped with means permitting the transfer to the mold and core of the heat necessary for the vulcanization.

14. A machine according to claim 9, characterized by the fact that:
- said transporting means comprise a crane mounted for sliding along the frame and the crane is equipped with a gripper capable of grasping a core by the radially inner base thereof,
- the machine is used with at least one core more than the number of outer parts of mold and by the fact that the vulcanization station includes an encaser which makes it possible to assure the molding of the raw tire by imparting to it the necessary molding pressure and assuring a transfer of heat said tire,
- the vulcanization station comprises at least one annexed housing associated with the encaser, making it possible to maintain the mold containing the tire isolated from the environment in order to avoid heat losses, at least during the time necessary for the vulcanization, and means for transferring the closed mold between the encaser and the annexed housing or one of the annexed housings,
- the movements of the transport means and the transfer means are under the control of an automatic system having a program enabling it to select the position towards which the cranes transport a given core as a function of the normal sequence of the manufacturing operations of the tire and as a function of the occupation of the stations at the time of a transfer, and to select the position towards which the transfer means bring a given mold as a function of the normal sequence of tire manufacturing operations and as a function of the occupation of the positions available at the vulcanization station at the time of a transfer.

15. A tire manufacturing machine comprising at least one support forming, in the configuration used for the assembly, a surface of revolution having a continuous shape close to the final shape of manufacture of the tire, said support being retractable radially, said support being used as reference surface for the manufacture of said tires from the start of assembling through vulcanization, said machine comprising
- a tire assembling station comprising means for grasping and holding the support and means for building the raw tire by depositing on the support different components in the order and at the place required by the architecture of the tire,
- a vulcanization station,
- a support handling station with means for radially retracting said support,
- a single frame designed to be transportable and on which the stations are mounted and aligned,
- said aligned stations on the frame defining a reference axis, and means mounted on the frame and guided along an axis parallel to the reference axis of the stations on the frame for transporting the support between the different stations and means at each station for receiving the support from the support-transporting means.

16. A machine according to claim 1 or 15, characterized by the fact that the transporting means are adapted to assure a transfer of the support with its axis horizontal.

17. A machine according to claim 16, characterized by the fact that the transporting means are adapted to assure a transfer of the core along a movement at least part of which is parallel to the of the core axis.

18. A machine according to claim 1 or 15, characterized by the fact that the vulcanization station comprises an encaser which makes it possible to assure the molding of the raw tire by imparting to it the necessary molding pressure and assuring a transfer of heat towards said tire, and by the fact that the vulcanization station comprises at least one annexed housing associated with the encaser which makes it possible to maintain a closed mold containing the tire isolated from the environment in order to avoid heat losses at least during the time necessary for the vulcanization, and means for the transfer of the closed mold between the encaser and the annexed housing or one of the annexed housings.

19. A tire manufacturing machine comprising at least one support forming, in the configuration used for the assembly a surface of revolution having a continuous shape close to the final shape of manufacture of the tire, said support being retractable radially said support being used as reference surface for the manufacture of said tire from the start of assembling through vulcanization, a tire assembling station including means for holding and rotating the support and means for building the raw tire by depositing on the support different components in the order and at the place required by the architecture of the tires a vulcanization station, a support handling station including means for radially retracting said support, a common frame designed to be transportable and on which all of said stations are supported for transportation to and for use at a tire manufacturing site, the stations being aligned on the frame, said aligned stations on the frame including a reference axis, means for receiving the support from the tire assembling station and transporting the support to the different stations for the vulcanization of the tire and removal of the tire from the support, guide means mounted on the frame for guiding the support-transporting means from station to station along an axis parallel to the reference axis of the stations on the frame and means at each station for receiving the support from the support-transporting means.

20. A tire manufacturing machine comprising a frame designed to be transportable to and ready to operate at a tire manufacturing site, at least one support forming, in configuration used for the assembly, a surface of revolution having a continuous shape, close to the final shape of manufacture of the tire, said support being used as a reference surface for the manufacture of said tire from the start of the assembling until after the vulcanization, means carried by said frame for dismantling said support to free the tire after vulcanization, means carried by said frame for reconstituting the support for use as a reference surface, a tire assembly station carried by said frame having means for holding and rotating the support and means for building the raw tire by depositing on the support different components in the order and at the place required by the architecture of the tire, a vulcanization station carried by said frame, said stations being arranged adjacent each other in a line on the frame, means for receiving the support from the tire assembly station and transporting the support between the stations, guide means mounted on at least one side of the frame for guiding the support transporting means along a line parallel to the in-line arrangement of the stations on the frame to positions adjacent the stations for the processing of the support at each station and means at each station for receiving the support from the support-transporting means.

21. A tire manufacturing machine comprising a frame designed to be transportable to a tire manufacturing site, at least one support forming, in configuration used for the assembly, a surface of revolution having a continuous shape, close to the final shape of manufacture of the tire, said support being used as a reference surface for the manufacture of said tire from the start of the assembling until after the vulcanization, a tire assembly station carried by said frame, having means for holding and rotating the support and means for building the raw tire by depositing on the support different components in the order and at the place required by the architecture of the tire, a vulcanization station carried by said frame for accommodating a plurality of supports for the vulcanization of the tires and including an encaser for encasing the raw tire on a support within an outer mold and for transmitting to the raw tire heat necessary for vulcanization and a transfer carriage for transporting the support and outer mold to and from a vulcanizing chamber, a support handling station carried by said frame for dismantling said support for freeing the tire after vulcanization and for reconstituting the support before its return to the assembly station to shape the raw tire, said stations being arranged adjacent each other on the same frame and aligned along an axis of the frame, means for receiving the support from the assembly station and transporting the support to the different stations, guide means mounted on at least one side of the frame for guiding the support transporting means from station to station along an axis parallel to the axis of the stations on the frame, means at each station for receiving the support from the support-transporting means and means imparting lateral movement to the support-transporting means to deliver the support to the support-receiving means at said station.

22. A tire manufacturing machine as set forth in claim 21 in which the vulcanizing chambers are accommodated in side-by-side telescoping walls.

23. A tire manufacturing machine as set forth in claim 12 comprising a tire cooling station carried on said frame adjacent the support handling station for cooling the vulcanized tires before freeing the tire.

* * * * *

UNITED STATES PATENT AND TRADEMARK OFFICE
CERTIFICATE OF CORRECTION

PATENT NO. : 5,908,531
DATED : June 1, 1999
INVENTOR(S) : Daniel Laurent

It is certified that error appears in the above-identified patent and that said Letters Patent is hereby corrected as shown below:

On the title page, item:

[57] ABSTRACT, line 3: "sa8d" should read -- said --.

Column 2, line 6: "space-of" should read -- space of --.

Column 3, line 22: "tire;" should read -- tire; and --.

Column 5, line 27: "station;" should read -- station; and --.

Column 8, line 1: "30" should be deleted;

line 46 : "vulcanizations" should read -- vulcanization, --.

Column 9, line 29: "or" should be deleted.

Column 10, line 6: "heat said" should read -- heat to said --;

line 33: "comprising" should read -- comprising: --;

lines 44-45: "aligned, ¶said" should read -- aligned, said --;

line 58: "to the of the core axis." should read -- to the axis of the core. --.

UNITED STATES PATENT AND TRADEMARK OFFICE
CERTIFICATE OF CORRECTION

PATENT NO. : 5,908,531
DATED : June 1, 1999
INVENTOR(S) : Daniel Laurent

It is certified that error appears in the above-identified patent and that said Letters Patent is hereby corrected as shown below:

Column 11, line 6: "assembly" should read -- assembly, --.

line 9: "radially" should read -- radially, -- and "reference" should read -- a reference --;

line 15: "tires" should read -- tire, --;

line 27: "frame and" should read -- frame, and --;

line 30: "frame" should read -- frame, --.

Column 12, line 43: "claim 12" should read -- claim 21 --.

Signed and Sealed this

Twenty-fifth Day of July, 2000

Attest:

Q. TODD DICKINSON

*Attesting Officer*          *Director of Patents and Trademarks*